(12) United States Patent
Wong (10) Patent No.: US 6,341,217 B1
(45) Date of Patent: *Jan. 22, 2002

(54) PORTABLE TELEPHONE WITH SHIELDED TRANSMISSION ANTENNA

(75) Inventor: Alfred Y. Wong, Los Angeles, CA (US)

(73) Assignee: A. W. Technologies, LLC, Beverly Hills, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/420,953

(22) Filed: Oct. 19, 1999

Related U.S. Application Data (63) Continuation of application No. 09/241,623, filed on Feb. 1, 1999.

(51) Int. Cl.[7] .............................. H04B 1/38; H04B 1/04; H04M 1/00
(52) U.S. Cl. ...................... 455/90; 455/128; 379/446
(58) Field of Search .............................. 455/70, 117, 78, 455/575, 128, 90; 343/702, 841; 174/35 R; 379/446, 454, 455

(56) References Cited

U.S. PATENT DOCUMENTS

| | | |
|---|---|---|
| 4,899,164 A | 2/1990 | McGrath |
| 5,124,889 A | 6/1992 | Humbert et al. |
| 5,150,282 A | 9/1992 | Tomura et al. |
| 5,153,600 A | 10/1992 | Metzler et al. |
| 5,170,173 A | 12/1992 | Krenz et al. |
| 5,335,366 A | 8/1994 | Daniels |
| 5,367,309 A | 11/1994 | Tashjian |
| 5,373,304 A | 12/1994 | Nolan et al. |
| 5,392,461 A | 2/1995 | Yokoyama |
| 5,444,866 A | 8/1995 | Cykiert |
| 5,507,012 A | 4/1996 | Luxon et al. |
| 5,525,988 A | 6/1996 | Perkins et al. |
| 5,530,919 A | 6/1996 | Tsuru et al. |
| 5,541,609 A | 7/1996 | Stutzman et al. |
| 5,550,552 A | 8/1996 | Oxley |
| 5,564,085 A | 10/1996 | Chen et al. |
| 5,613,221 A | * 3/1997 | Hunt ........................ 455/89 |

(List continued on next page.)

FOREIGN PATENT DOCUMENTS

| | | | |
|---|---|---|---|
| EP | 348 187 | * 12/1989 | ............ H04M/1/72 |
| JP | 409168043 | * 6/1997 | |
| JP | 409201220 | * 8/1997 | |
| JP | 10-126476 | * 5/1998 | ............ H04M/1/17 |
| JP | 411286815 | * 10/1999 | |
| WO | WO94/28595 | 12/1994 | |
| WO | WO98/01919 | 1/1998 | |
| WO | WO98/29968 | 7/1998 | |

OTHER PUBLICATIONS

Yildrim, B.S., et al., Finite–Difference Time–Domain Analysis of a Dual Resonance and Shielded Cellular Antenna, *IEEE Digest*, Aug. 6, 1997, pp. 1751–1754.

*Primary Examiner*—Vivian Chang
*Assistant Examiner*—Charles N. Appiah
(74) *Attorney, Agent, or Firm*—Irah H. Donner; Hale and Dorr LLP (57) ABSTRACT

A portable telephone has an antenna structure that directs radiated energy away from the user's head. In one embodiment, an external transmission antenna is disposed within a jacket for the portable telephone. A grounded metallic surface is interposed between the antenna and the user's head. The metallic surface is spaced apart from the radiating element of the transmission antenna by one-quarter of the effective wavelength, so as to maximize the reflection of energy away from the user's head.

23 Claims, 5 Drawing Sheets

U.S. PATENT DOCUMENTS

| | | |
|---|---|---|
| 5,657,386 A | 8/1997 | Schwanke |
| 5,666,125 A | 9/1997 | Luxon et al. |
| 5,694,137 A | 12/1997 | Wood |
| 5,726,383 A | 3/1998 | Geller et al. |
| 5,777,586 A | 7/1998 | Luxon et al. |
| 5,787,340 A | 7/1998 | Sepponen |
| 5,826,201 A | 10/1998 | Gratias |
| 6,075,977 A * | 6/2000 | Bayrami ...................... 455/90 |
| 6,088,603 A * | 7/2000 | Wilson ........................ 455/575 |
| 6,095,820 A * | 8/2000 | Luxon et al. ................ 434/702 |

* cited by examiner

PORTABLE TELEPHONE WITH SHIELDED TRANSMISSION ANTENNA

RELATED APPLICATION

This is a continuation-in-part of co-pending application Ser. No. 09/241,623 filed on Feb. 1, 1999.

BACKGROUND OF THE INVENTION

1. Field of the Invention

The present invention relates generally to the field of portable telephones. More particularly, it relates to a portable telephone with improvements for directing the radiated power away from the telephone user's head.

2. Prior Art

Cellular telephones and cordless telephones (collectively referred to as "portable telephones") are widely used. In recent years, concerns have been expressed about the health effects of long term exposure to the energy radiated by portable telephones. A cellular telephone or cordless telephone uses frequencies in the VHF to microwave range to reach a base station, which then relays communications through a telecommunications network to a destination. Each telephone relies on a transmission antenna that radiates energy outwardly in all directions. Because this antenna is held very close to the user's head, a significant portion of the radiated energy passes through the head on its way to the base station. One estimate places the power absorbed by the head at as high as 50% of the total radiated power. Since an average cellular telephone radiates a power of 600 milliwatts, the extended use of a telephone, for example over 20 minutes, will mean an energy deposit greater than 720 joules into the head. This amount of energy is sufficient to raise the temperature of 17 gm of water by 10 degrees.

In view of the fact that the radiating frequency of a cellular telephone is as high as 1.8 GHz and that of a cordless telephone has reached the high frequency of 2.4 GHz, which is very close to the characteristic frequency of water molecules commonly used in microwave ovens (2.45 GHz), it is important to shield the user from such potentially harmful radiation. Even though precise medical studies on the effect of radiation upon the human brain are not yet complete, prudence compels finding a method of protecting the portable telephone user from unnecessary and potentially harmful radiation. With the anticipated rapidly expanding market for cellular and cordless phones, even higher frequencies will certainly be used to meet the demand for increased bandwidth. The need to protect the telephone users from harmful radiation will be correspondingly greater.

Furthermore, since it is desirable to make portable telephones as light and compact as possible, energy efficiency is an important design consideration. By avoiding the undesirable propagation and absorption of radiation into the user's head, a portable telephone can more efficiently direct radiation into a wide angle away from the user's head.

Various shielding devices have been proposed for portable telephones. For example, such devices are shown in U.S. Pat. Nos. 5,367,309; 5,373,304; 5,444,866; 5,525,988; 5,541,609; 5,507,012; 5,550,552; 5,564,085; 5,613,221; 5,657,386; 5,666,125; 5,694,137; 5,726,383; 5,777,586; 5,787,340; and 5,826,201.

Another approach, and one that is more relevant to the present invention, is disclosed in U.S. Pat. No. 5,530,919. This patent discloses a mobile communicator, such as a cellular telephone, in which the energy radiated by the transmission antenna in the direction of the user's head is attenuated by a ground electrode pattern on an internal circuit board. As disclosed, the transmission antenna comprises a miniature surface-mounted antenna on a circuit board. The opposite side of the circuit board has a ground electrode pattern covering an area that extends beyond the outline of the antenna.

SUMMARY OF THE INVENTION

The present invention provides an improved method of shielding the user of a portable telephone from the energy radiated by the transmission antenna. In one embodiment, an external transmission antenna is disposed within a jacket for the portable telephone. A grounded metallic surface is interposed between the antenna and the user's head. The metallic surface is spaced apart from the radiating element of the transmission antenna by one-quarter of the effective wavelength, so as to maximize the reflection of energy away from the user's head.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
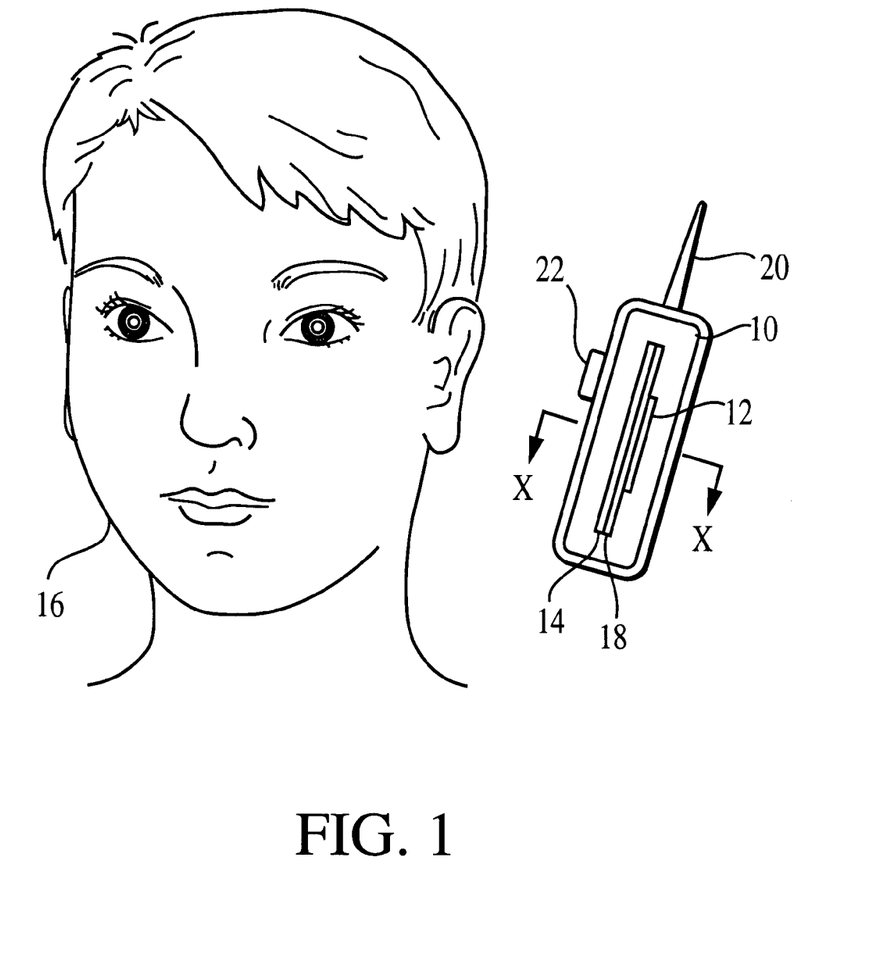
FIG. 1 diagrammatically illustrates a portable telephone 10 constructed in accordance with the present invention.

FIG. 1 illustrates a portable telephone 10 constructed in accordance with the present invention. Radio frequency signals are transmitted by transmission antenna 12. For purposes of these illustrative examples, antenna 12 is a single dipole; however, the invention is not limited in this regard, and other types of transmission antennas may be utilized. A separate receive antenna 20 may be employed, which offers the advantage of providing omnidirectional reception. Alternatively, antenna 12 may be utilized for both transmission and reception. A metallic surface 14 is interposed between transmission antenna 12 and the telephone user's head 16. Metallic surface 14 reflects energy radiated by antenna 12 away from the user's head.

Telephone 10 preferably includes a radiation monitor 22 on a portion of the telephone body where the shielding effect of metallic surface 14 is maximized. Radiation monitor 22 provides a visual indication that the radiated power at the monitor, and thus at the user's head, is below a level that may adversely affect the health of the user.

Ideally, the spacing between antenna 12 and metallic surface 14 is one-quarter of the electromagnetic wavelength so that reflection of the radiated energy is maximize, thereby maximizing the shielding effect for the user. At the transmission frequencies typically used by portable telephones, a spacing of one-quarter of the wavelength would increase the dimensions of telephone 10 to an unacceptable degree. Therefore, a dielectric material 18 is placed between antenna 12 and metallic surface 14.

A dielectric is a material consisting of electric dipoles which oscillate under the influence of an external electromagnetic wave and reradiate the wave. The net effect is to reduce the wavelength of an electromagnetic wave by the square root of the dielectric constant. For example, for a dielectric constant of 100, the effective wavelength inside the space containing the dielectric is 1/10 of the free space wavelength. As a result, the requirement for a separation of ¼ the electromagnetic wavelength in the medium can be more easily satisfied. For example, if the transmission frequency of a portable telephone is 1 GHz, ¼ of the wavelength is 7.5 cm. In an appropriate dielectric, ¼ of the effective wavelength becomes 0.75 cm, and such a spacing can be easily accommodated in an otherwise conventional portable telephone.

Suitable dielectric materials include a variety of substances, such as ceramics, mica and Mylar. The substance used can be light in weight so that the overall weight of the cellular or cordless telephone does not increase.

Figure 2:
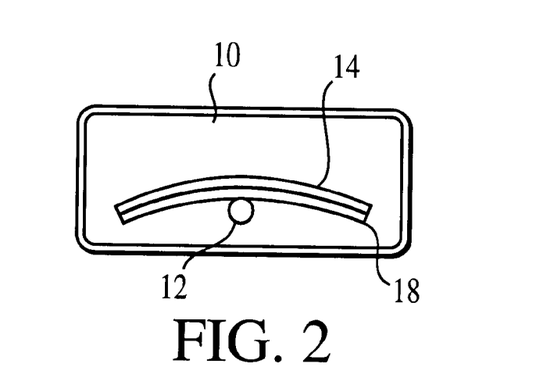
FIG. 2 is a partial cross-sectional view taken through line x—x in FIG. 1 of a first embodiment of the invention.
Figure 3:
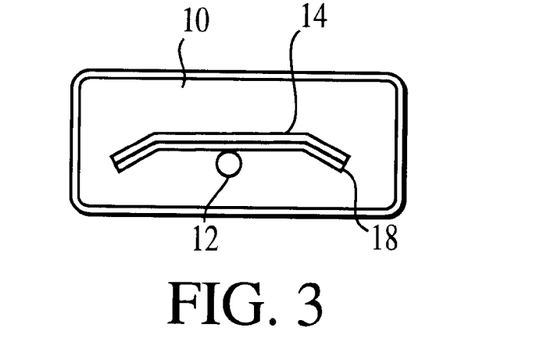
FIG. 3 is a partial cross-sectional view taken through line x—x in FIG. 1 of a second embodiment of the invention.

Metallic surface 14 may be non-planar so that the electromagnetic waves radiated by antenna 12 are reflected into a widely scattered area, The non-planar surface causes reflections of radiation from a single dipole into a much wider area than a planar surface and a single dipole. Metallic surface 14 may be curved, as shown in FIG. 2, or may be folded as shown in FIG. 3.

Figure 4:
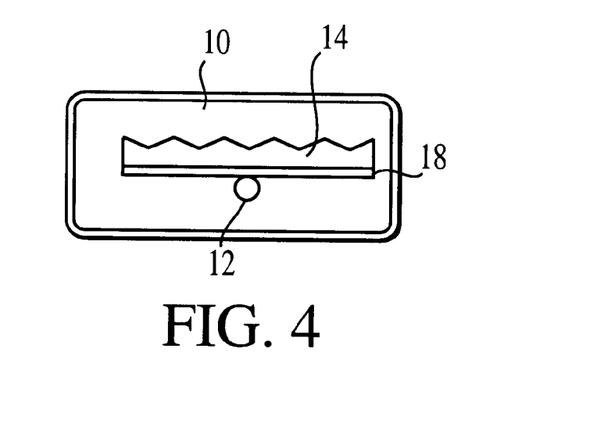
FIG. 4 is a partial cross-sectional view taken through line x—x in FIG. 1 of a third embodiment of the invention.

In a particular embodiment of the invention, metallic surface 14 is corrugated, as shown in FIG. 4. Such a corrugated surface gives rise to many image dipoles, thereby providing a wide pattern of radiation. The particular shape and size of the corrugations is not critical, the objective being to disperse the reflected radiation as widely as possible. The corrugations are preferably of comparable size or smaller than the spacing to antenna 12.

Figure 5:
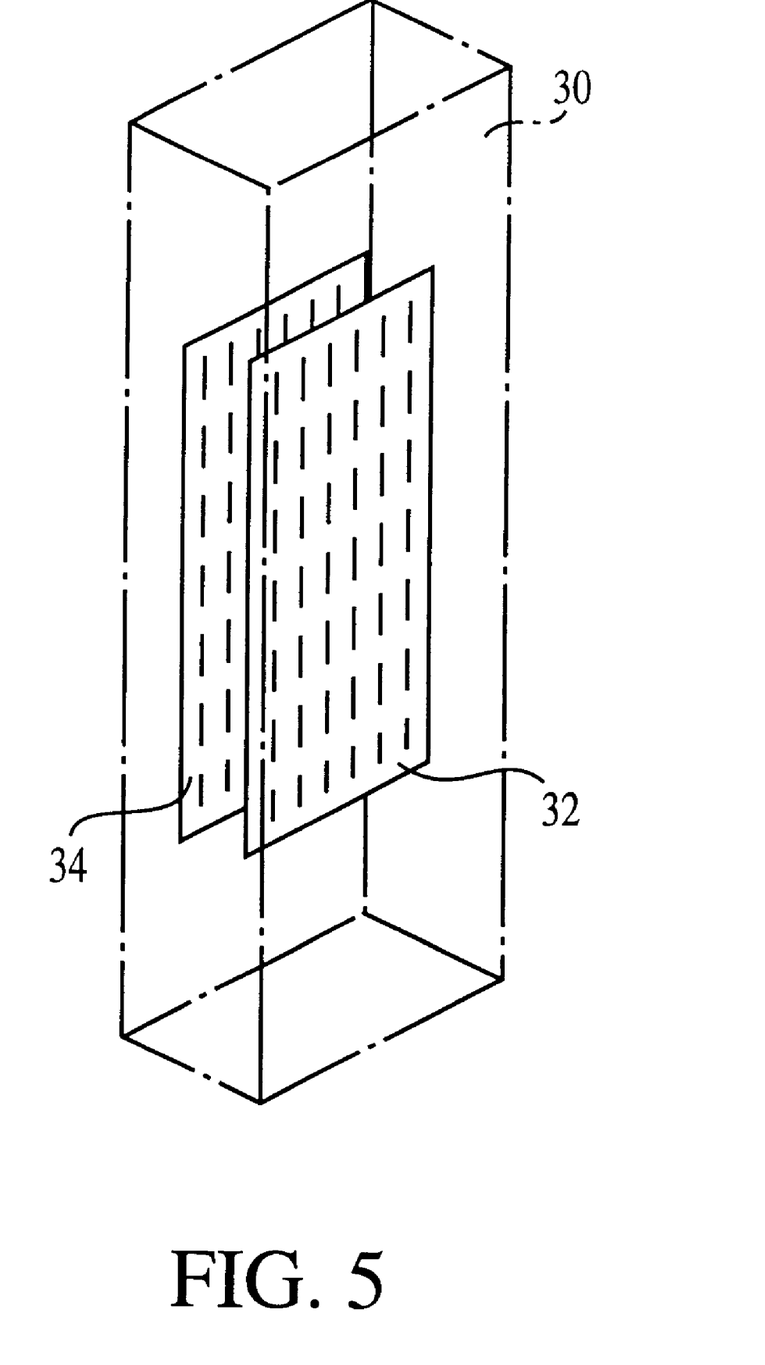
FIG. 5 illustrates another embodiment of the invention employing dual phased array transmission antennas.

As frequencies go higher, the physical dimensions of the antenna become smaller. At high frequencies, it is practical to utilize a phased-array antenna comprising a plurality of radiating elements. The amplitude and phase of each antenna element may be digitally controlled to generate a desired radiation pattern. FIG. 5 illustrates a portable telephone 30 which has dual planar arrays of radiating elements 32 and 34. By using dual arrays spaced apart by approximately ½ of the electromagnetic wavelength, the radiation pattern can be controlled to propagate energy in a forward direction, away from the telephone user's head. Such active control of the antenna pattern has the potential for offering significantly greater protection to the user in comparison to the passive methods previously described. Furthermore, active control of the antenna pattern allows the transmitted energy to be steered towards the cell station of a cellular telephone or base station of a cordless telephone. During reception, the antenna pattern can be scanned to seek the strongest signal. During transmission, power can then be preferentially radiated in the direction of the remote station. Such capability is particularly useful at higher frequencies where the signals are more directional.

Referring back to FIG. 1, the transmission antenna 12 may be disposed within the body of telephone 10. Alternatively, antenna 12 may be disposed within an attachment, such as a battery pack, to the telephone body. Most cellular telephones on the market today include an external antenna receptacle, usually covered by a removable rubber grommet. By using this receptacle, which automatically disconnects the telephone's built-in antenna, an external antenna may be conveniently connected to the telephone's transmitter.

Figure 6:
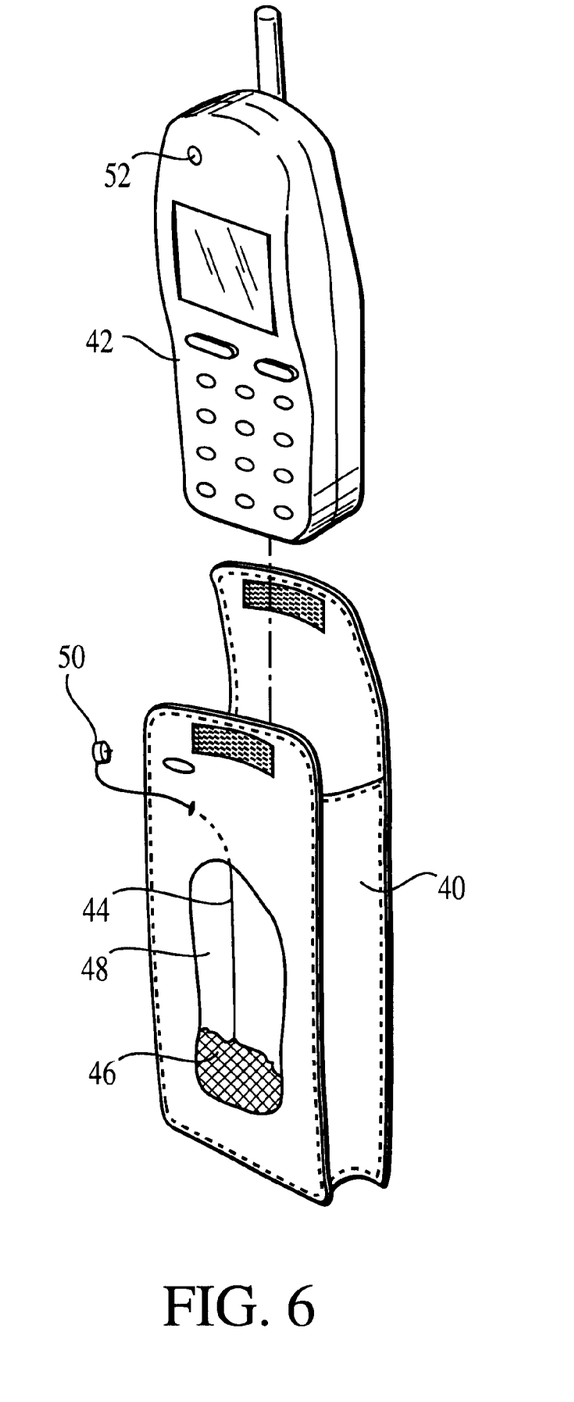
FIG. 6 is a partially cut-away view illustrating yet another embodiment of the invention.

FIG. 6 illustrates an external antenna disposed within a flexible jacket 40 for portable telephone 42. Jacket 40 may be a leather or fabric covering similar to conventional cases that are widely available for cellular telephones. As in the previously described embodiments, jacket 40 includes a transmission antenna 44 spaced apart from a ground plane 46 by a layer of dielectric material 48. Ground plane 46 preferably comprises a thin, flexible copper screen adjacent to the inner surface of jacket 40. Alternatively, a ground plane may be provided on the back side of the telephone housing. Again, the spacing between antenna 44 and ground plane 46 is preferably one-quarter of the effective wavelength of the transmission frequency. It will be appreciated that, since the transmission antenna 44 is on the back side of telephone 42 and is shielded by ground plane 46, the power radiated by antenna 44 is directed away from the user's head.

Antenna 44 is electrically coupled to connector 50, which mates with receptacle 52 on the body of telephone 42. As mentioned above, antenna 44 may be utilized for both transmission and reception or a separate receive antenna may be employed.

A problem frequently encountered with portable telephones is the lack of sufficient battery charge to place or complete a call. Unless a spare battery or alternate power source is available, the telephone user must be careful to conserve the charge remaining in the telephone's battery. It is therefore desirable to provide a means for mechanically charging the telephone battery. This is especially useful when a phone call must be placed urgently and no alternate source of power is available. By providing such a means for mechanical charging, the storage battery may be made smaller and lighter.

Figure 7:
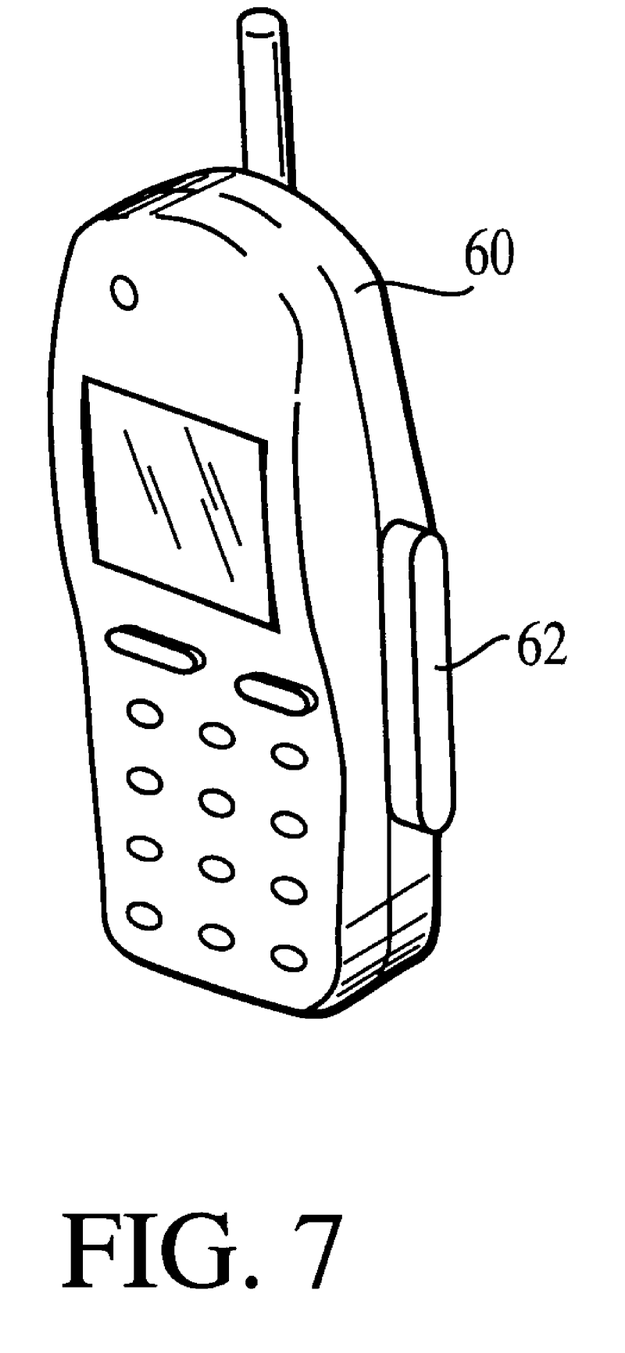
FIG. 7 illustrates a portable telephone that incorporates a mechanical battery charger.

FIG. 7 illustrates a telephone 60 with a built-in mechanical battery charger. A spring-loaded actuator 62 is disposed along one side of the telephone housing. By repetitively squeezing and releasing the actuator, mechanical energy is generated. The mechanical energy may be converted into electrical current for charging the telephone battery in a variety of ways. One such way is to use a generator actuated by fluid motion. The mechanical motion of actuator 62 causes a fluid to circulate within the telephone housing and impinge on the generator rotor, causing it to turn. The electrical output of the generator is applied to conventional regulating circuitry to charge the telephone battery at an appropriate voltage and current. An alternate method of converting mechanical energy to electrical current employs a piezoelectric device coupled to actuator 62. The pressure applied to the piezoelectric device is directly converted to an electrical current.

Yet another method of charging the telephone battery is somewhat similar to that used for self-winding mechanical watches. A pendulum within the telephone housing moves in response to movement by the telephone user. The pendulum has a ferrous portion that moves through a magnetic field like the armature of a generator, inducing electrical current in a coil.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. An accessory for a portable telephone having a main antenna, and an external antenna receptacle comprising:
   a jacket for the portable telephone;
   a radio frequency antenna disposed within the jacket;
   a connector coupled to the radio frequency antenna for mating engagement with the external antenna receptacle to enable the radio frequency antenna, and to disable the main antenna; and
   a metallic shield spaced apart from the radio frequency antenna so as to be disposed between the radio frequency antenna and a user of the portable telephone, thereby reflecting energy radiated by the radio frequency antenna in a direction away from the user.

2. The device of claim 1 further comprising a layer of dielectric material between the antenna and the metallic shield.

3. The device of claim 2 wherein the metallic shield is spaced apart from the antenna by a distance approximately equal to ¼ of an effective wavelength of a radio frequency signal transmitted by the antenna.

4. An accessory for a portable telephone according to claim 3, wherein the distance between the radio frequency antenna and the metallic shield substantially maximizes the reflection of the energy radiated, thereby substantially maximizes the shielding effect for a user of the portable telephone.

5. The device of claim 1 wherein the metallic shield is disposed within the jacket.

6. The device of claim 5 wherein the metallic shield comprises a metallic mesh.

7. An accessory for a portable telephone according to claim 1, further comprising a radiation monitor on a portion of the portable telephone body where the shielding effect of the metallic shield is maximized, providing a visual indication of the radiated power at the radiation monitor, and substantially near a user's head.

8. An accessory for a portable telephone according to claim 1, wherein the metallic shield includes a non-planar surface portion thereby reflecting the energy in a scattered area.

9. An accessory for a portable telephone according to claim 8, wherein the non-planar surface portion of the metallic shield includes at least one of a curved and folded surface portion to thereby reflect the energy in a scattered area.

10. An accessory for a portable telephone according to claim 1, wherein the radio frequency antenna comprises a phased-array antenna.

11. An accessory for a portable telephone according to claim 10, wherein the phased-array antenna comprises a plurality of radiating elements.

12. An accessory for a portable telephone according to claim 11, wherein the plurality of radiating elements comprises dual-planar arrays of radiating elements.

13. An accessory for a portable telephone according to claim 12, wherein the dual planar arrays of radiating elements are spaced apart by approximately ½ of wavelength of a radio frequency signal transmitted by the radio frequency transmission antenna.

14. A portable telephone comprising:
   a radio frequency transmitter;
   a jacket for the portable telephone;
   a radio frequency transmission antenna disposed within the jacket and coupled to the radio frequency transmitter;
   a dielectric layer disposed in the jacket and between the radio frequency transmission antenna and a user of the telephone, and spaced apart from the radio frequency transmission antenna by a distance approximately equal to ¼ of an effective wavelength of a radio frequency signal transmitted by the radio frequency transmission antenna; and
   a metallic shield spaced apart, disposed in the jacket and isolated from the radio frequency transmission antenna via said dielectric layer to reflect energy radiated by the radio frequency transmission antenna in a direction away from the metallic shield.

15. The device of claim 14 further comprising a radio frequency receiving antenna separate from the transmission antenna.

16. An accessory for a portable telephone according to claim 14, further comprising a radiation monitor on a portion of the portable telephone body where the shielding effect of the metallic shield is maximized, providing a visual indication of the radiated power at the radiation monitor, and substantially near a user's head.

17. An accessory for a portable telephone according to claim 14, wherein the distance between the radio frequency antenna and the metallic shield substantially maximizes the reflection of the energy radiated, thereby substantially maximizes the shielding effect for a user of the portable telephone.

18. An accessory for a portable telephone according to claim 14, wherein the metallic shield includes a non-planar surface portion thereby reflecting the energy in a scattered area.

19. An accessory for a portable telephone according to claim 18, wherein the non-planar surface portion of the metallic shield includes at least one of a curved and folded surface portion to thereby reflect the energy in a scattered area.

20. An accessory for a portable telephone according to claim 14, wherein the radio frequency transmission antenna comprises a phased-array antenna.

21. An accessory for a portable telephone according to claim 20, wherein the phased-array antenna comprises a plurality of radiating elements.

22. An accessory for a portable telephone according to claim 21, wherein the plurality of radiating elements comprises dual planar arrays of radiating elements.

23. An accessory for a portable telephone according to claim 22, wherein the dual planar arrays of radiating elements are spaced apart by approximately ½ of wavelength of a radio frequency signal transmitted by the radio frequency transmission antenna.

* * * * *

UNITED STATES PATENT AND TRADEMARK OFFICE
CERTIFICATE OF CORRECTION

PATENT NO. : 6,341,217 B1
DATED : January 22, 2002
INVENTOR(S) : Alfred Y. Wong It is certified that error appears in the above-identified patent and that said Letters Patent is hereby corrected as shown below:

<u>Title page,</u>
Item [56], under the "FOREIGN PATENT DOCUMENTS" section, please insert -- DE 4221121
      EP 0883206
      EP 0741462 --

Signed and Sealed this

Twenty-third Day of July, 2002

Attest:

Attesting Officer

JAMES E. ROGAN
Director of the United States Patent and Trademark Office